No. 866,782.   PATENTED SEPT. 24, 1907.
G. GEISENDORFER.
STOP FOR CUT-OFF SAWS.
APPLICATION FILED MAR. 8, 1906.
2 SHEETS—SHEET 1.
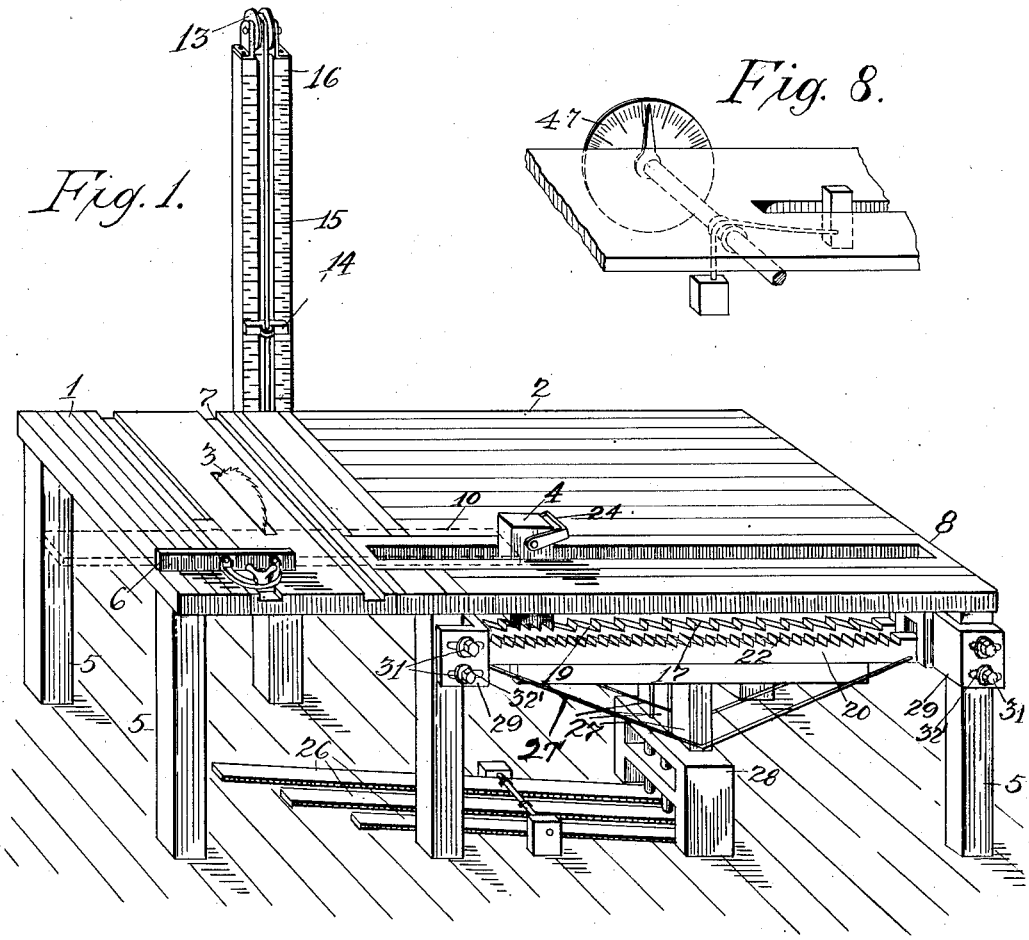
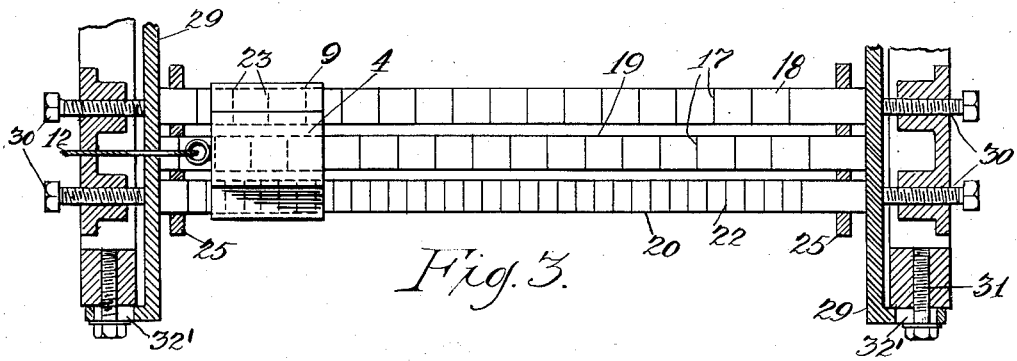
WITNESSES:   INVENTOR.
George Geisendorfer
BY Spear & Seely
ATTORNEYS.

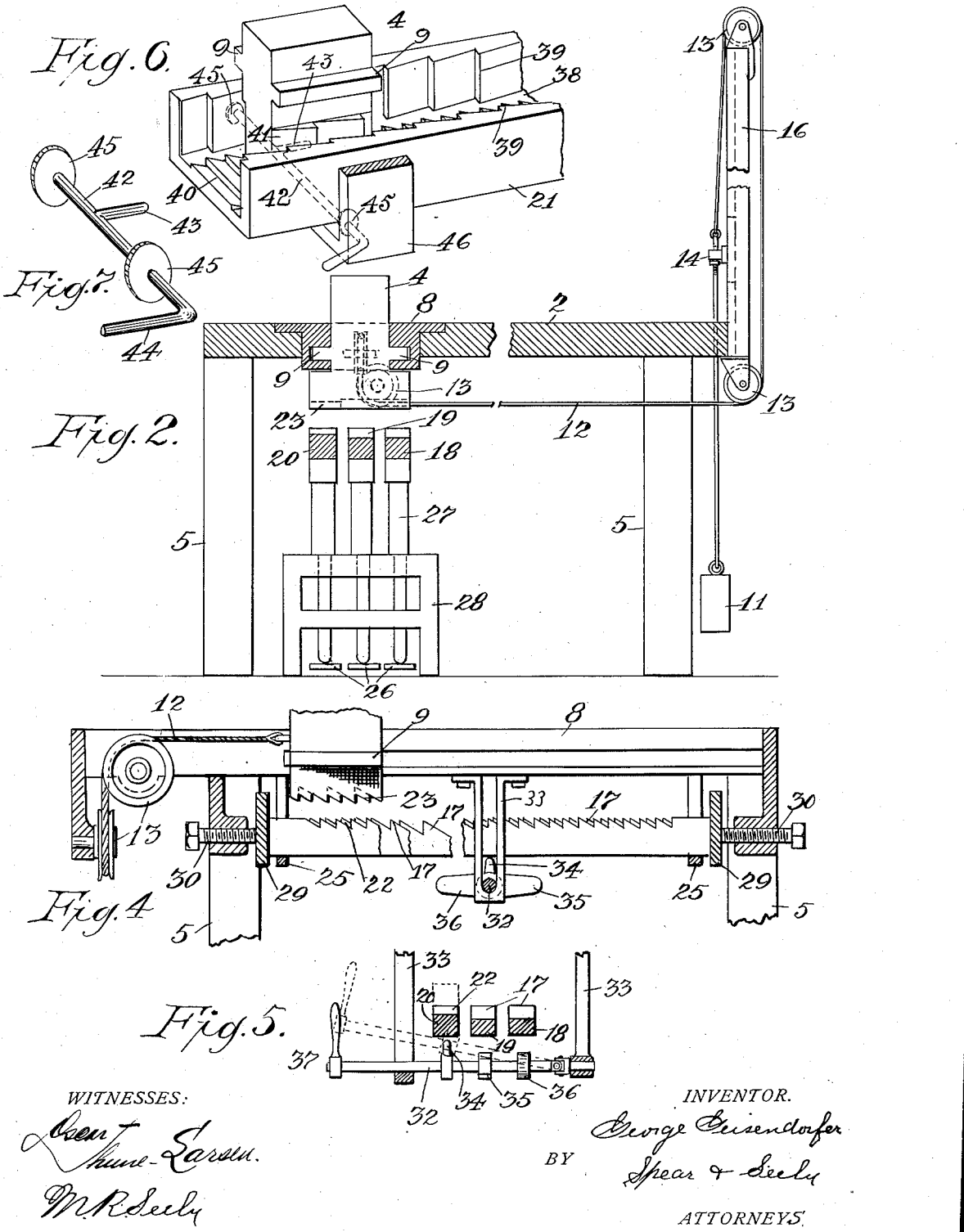

UNITED STATES PATENT OFFICE.

GEORGE GEISENDORFER, OF UPTON, CALIFORNIA.

STOP FOR CUT-OFF SAWS.

No. 866,782.  Specification of Letters Patent.  Patented Sept. 24, 1907.

Application filed March 8, 1906. Serial No. 304,995.

*To all whom it may concern:*

Be it known that I, GEORGE GEISENDORFER, a citizen of the United States, residing at Upton, in the county of Siskiyou and State of California, have invented certain new and useful Improvements in Stops for Cut-Off Saws, of which the following is a specification.

My invention relates to saw tables and more particularly to the cut off stop for the same and the means for adjusting it.

In cutting lumber, as boards, into pieces of any desired length, it is necessary to set the cut off stop at the proper distance from the saw and it is very desirable that this be done without the necessity of measuring it every time or resorting to graduations upon the table top. I accomplish this by providing one or more shouldered surfaces which are adapted to be moved into engagement with the stop and hold it against movement whenever it has been moved to the desired point, which is preferably indicated by a suitable index or pointer.

The means for engaging with the stop may be constructed and operated differently but the principle involved is the same in all and is illustrated in the accompanying drawings in which:

Figure 1 is a perspective view of a saw table provided with one means for controlling the stop and indicating its position. Fig. 2 is a transverse sectional view of a portion of the same. Fig. 3 is a broken horizontal sectional view. Fig. 4 is a similar longitudinal vertical sectional view. Fig. 5 is a sectional view of a different form of operating means. Fig. 6 is a perspective view of a different form of rack and stop. Fig. 7 is a detail view. Fig. 8 shows a modification.

Although my invention is adapted to be used upon or in connection with any kind or style of a saw table, yet in the drawings I have shown a table comprising two parts or sections, 1 and 2, one of which is provided with the saw 3 and the other with my stop 4 and the mechanism for operating it. The tops of the two sections are even and may be continuous and are supported by suitable legs 5 and section 1 is provided with a back stop or gage 6 which is adapted to be moved back and forth in grooves or ways 7 that extend across the top parallel with the saw for forcing the material against the saw.

The stop 4 is reciprocally mounted in a suitable guide 8 in the top of section 2, as by means of wings 9, and has its upper end projecting far enough above the top of the table to be engaged by the board 10, as indicated by dotted lines in Fig. 1. The stop is freely movable from one end of the guide way to the other and is returned to its normal position at the end of the slot nearest the saw by a weight or spring, the former being shown at 11 in Fig. 2. A cord 12 from the stop to the weight passes over pulleys 13 and is provided with an index or pointer 14 which is adapted to be moved vertically over a scale 15 on the face of an upright 16 secured to the table, preferably opposite the operator. The scale is divided into quarter inches on one side of the cord and other parts of an inch on the other side, whereby the operator can more readily determine when the pointer is at the correct division, as there is less liability of his mistaking the proper mark.

The stop is held in its adjusted position by means of a plurality of shouldered surfaces, preferably inclined away from the normal position of the stop, and the lower end or foot of the stop is provided with similar shoulders for being engaged by the shouldered surfaces. In the construction shown in Figs. 1 to 5, the shoulders are formed by recesses in separate and independently movable bars 18, 19 and 20, while in the form shown in Fig. 6, they are upon one piece, 21. With the three bars the shoulders are formed on top with the shoulders 17 upon two of them the same distance apart, as half an inch, but arranged to alternate with each other, as shown in Fig. 3, whereby an adjustment of quarters, halves and full inches may be made, and the shoulders 22 of the other bar are placed at eighths of an inch apart to secure an adjustment of the stop to that length. The bottom of the stop is recessed to form corresponding shoulders 23, those for the eighth inch shoulders of the bar 20 being only half the distance apart as the shoulders for the other two bars. When measurements less than an eighth of an inch are desired, as sixteenths, a plate 24 may be placed against the face of the stop, as by pivotally securing it to the sides of the stop so as to be swung into or out of operative position.

The recessed or shouldered bars may be supported and operated in any suitable manner, but I have shown them as mounted in guide blocks 25 between the ends of section 2 of the table top, which permits of vertical movement into and out of engagement with the shouldered portion of the bottom of the stop, but prevents lateral movement. They are moved vertically into engagement with the stop by treadles or foot levers 26, which engage with stems 27 that are secured to the bars, and preferably provided with inclined braces 27' as shown, and extend down through a suitable standard or guide block 28. The free ends of the levers are located in convenient position for being actuated by the operator, as by being depressed by the foot.

To insure perfect accuracy of the stop, as by causing its face to be the exact distance from the saw indicated by the scale, it may be necessary at times to change the position of the bars longitudinally, relative to the saw, as when using a saw that cuts a wider kerf, as by being wider or having a wider set than the one previously used. In this case, two plates 29 are used, one at each end of the bars, which plates are moved forward by screws 30 and are held in their adjusted positions by bolts 31 through slots 32' in their ends into the table frame.

Instead of operating the bars by the foot, as when the invention is used upon a different style of machine, as the automatic, the bars may be moved vertically into engagement with the stop by other means, as a combined rock shaft and lever 32, which is journaled in hangers 33, as shown in Figs. 4 and 5. The shaft is preferably provided with a projection 34 for engaging with one of the bars when the outer end of the shaft is raised vertically, as shown in Fig. 5, and with oppositely located arms 35 and 36 for engaging with the other two bars when the shaft is rocked in either direction by the handle 37.

Instead of forming the shoulders on separate bars they may be formed upon the single bar 21, as shown in Fig. 6, in which case the bar is provided with a three sided recess 38 extending from one end to the other. The half inch shoulders 39, are preferably formed upon opposite sides of the channel and so arranged as to alternate with each other and the eighth inch shoulders 40 are formed upon the bottom. The sides and bottom of the foot or stem of the block are provided with shoulders 41, for being engaged by the respective shoulders of the bar according as the bar is moved vertically or laterally in either direction. The bar is moved into engagement with the stop by any suitable means, as a rock shaft 42, which is rotatably and longitudinally-movably mounted below the bar and is provided with a projection 43 which is adapted to engage with and lift up the bar when the shaft is rotated by the handle 44. Two projections or disks 45 are secured to the shaft so as to engage with the respective sides of the bar and move it laterally when the shaft is moved longitudinally in either direction. The bar is supported in a suitable hanger 46, at each end, only one of which is shown in the drawings.

Instead of using a vertical standard for the scale as shown in Fig. 1, a dial may be used as shown in Fig. 8 at 47. By feeding the material to the saw endwise instead of crosswise the stop can be utilized as gage for rip saws as well as for a cut off stop.

In operating my invention the stop is forced back, preferably by the end of the board, until the index passes the last mark preceding the one at which it is to be set and the desired bar or shouldered surface is moved by the attendant, either by foot or hand power, as the case may be, so as to cause its inclined shouldered portion to engage with the inclined shouldered portion of the stop, after which the stop is forced out as far as it will go, or until its shoulders engage with the shoulders on the bar, the inclination of the shoulders permitting this movement, and which will cause the index to move into register with the proper mark on the scale. When it is desired to release the stop the bar is moved out of engagement therewith, when the weight will instantly return the stop to its normal position. In case a length other than an eighth is to be cut the plate 24 is swung into position on the face of the stop and the stop is manipulated as before, after which the plate can be swung over to the rear of the stop out of the way, as shown in Fig. 1.

From the foregoing it will be seen that the stop is very simple and efficient and as the scale is always in full sight of the operator the stop can be set correctly at any point almost instantly which makes it very rapid and absolutely accurate.

Having described my invention, I claim:

1. In a stop for cut off saws, a saw table, a shouldered stop movably mounted thereon, and a plurality of shouldered surfaces for engaging with the stop and holding it at any desired point in the slot, said shoulders being at different distances apart.

2. In a stop for cut off saws, a slotted saw table, a stop reciprocally mounted in said slot, shouldered surfaces for engaging with the stop and holding it at any desired point in the slot, and means for moving said surfaces.

3. In a stop for cut off saws, a slotted saw table, a winged stop reciprocally mounted in the slot with its lower end projecting below the table, an indicator connected with the stop, and shouldered surfaces for engaging with said projecting portion and holding the stop at any desired point in the slot.

4. In a stop for cut off saws, a slotted saw table, a stop reciprocally mounted in the slot, an indicator connected with the stop, a plurality of shouldered bars, each adapted to be moved into engagement with the stop, and means for moving each bar into said engagement independently of the others.

5. In a stop for cut off saws, a slotted saw table, a shouldered stop reciprocally mounted in the slot, an indicator connected with the stop, a plurality of vertically movable, shouldered bars, means for holding said bars parallel, and means for moving each of the bars into engagement with the stop independently of the others.

6. In a stop for cut off saws, a slotted saw table, a stop reciprocally mounted therein, an indicator connected with the stop, a plurality of vertically movable shouldered bars for engaging with the stop and locking it against movement, each provided with a stem, means for holding said bars parallel, and a lever for engaging with each of said stems.

7. In a stop for cut off saws, a slotted saw table, a stop reciprocally mounted in the slot, an indicator connected therewith, a plurality of shouldered bars for engaging with the stop, and means for moving the bars longitudinally.

8. In a stop for cut off saws, a slotted table, a stop reciprocally mounted in the slot, an indicator connected with the stop, a plurality of shouldered bars for engaging with the stop, a plate at each end of said bars, screws for adjusting the same to move the bars longitudinally, and bolts for securing the plates in their adjusted positions.

9. In a stop for cut off saws, a slotted table, a graduated standard secured thereto, pulleys on the standard and on the table, a stop reciprocally mounted in said slot, a cord from the stop over said pulleys and provided with a weight at its free end, an index on the cord adapted to be moved in front of the graduations on said standard, and means for locking the stop at any desired point in the slot of the table.

In testimony whereof I have affixed my signature, in presence of two witnesses, this 27th day of February 1906.

GEORGE GEISENDORFER.

Witnesses:
E. H. KAUPP,
J. M. SCHULER.